United States Patent
Hübler et al.

(10) Patent No.: US 6,265,675 B1
(45) Date of Patent: Jul. 24, 2001

(54) APPARATUS FOR WEIGHING MOVING POSTAL MATTER

(75) Inventors: Uwe Hübler, Berlin; Carsten Müller, Gmünd; Michael Schmidt-Kretschmer, Lehnitz, all of (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 0 days.

(21) Appl. No.: 09/354,264

(22) Filed: Jul. 15, 1999

(30) Foreign Application Priority Data

Jul. 17, 1998 (DE) .............................. 198 33 767

(51) Int. Cl.⁷ .................... G01G 19/40; G01G 19/00; G01G 21/22
(52) U.S. Cl. .............. 177/25.15; 177/145; 177/253; 177/262; 705/406; 705/407
(58) Field of Search ................ 177/25.11, 25.12, 177/25.13, 25.15, 145, 253, 262; 705/406, 407

(56) References Cited

U.S. PATENT DOCUMENTS

| | | | |
|---|---|---|---|
| D. 398,335 | | 9/1998 | Friedrich et al. ............ 177/25.15 |
| 3,861,480 | * | 1/1975 | Zucker et al. ................ 177/145 |
| 3,877,531 | * | 4/1975 | Storace et al. .............. 177/25.15 |
| 4,120,371 | * | 10/1978 | Zohn et al. .................. 177/262 |
| 4,239,088 | * | 12/1980 | Check et al. ............. 177/210 FP |
| 4,892,162 | * | 1/1990 | Dolan ...................... 177/25.15 |
| 4,932,488 | * | 6/1990 | Tsay ......................... 177/145 |
| 4,956,782 | | 9/1990 | Freeman et al. .............. 705/407 |
| 5,065,000 | * | 11/1991 | Pusic ........................ 705/407 |
| 5,258,579 | * | 11/1993 | Wakasa ...................... 177/145 |
| 5,723,825 | * | 3/1998 | Dolan et al. ................. 177/145 |
| 5,834,708 | * | 11/1998 | Svetal et al. ................ 177/262 |
| 5,880,747 | | 3/1999 | Bartenwerfer et al. ........... 347/4 |
| 5,949,444 | | 9/1999 | Geserich et al. ............... 347/4 |

FOREIGN PATENT DOCUMENTS

| | | |
|---|---|---|
| 27 17 721 | 10/1978 | (DE) . |
| 37 09 564 | 3/1987 | (DE) . |
| 296 01 418 | 5/1996 | (DE) . |
| 196 05 015 | 3/1997 | (DE) . |
| 0 787 586 | 8/1997 | (EP) . |
| 1 521 022 | 8/1978 | (GB) . |

* cited by examiner

Primary Examiner—Randy W. Gibson
(74) Attorney, Agent, or Firm—Schiff Hardin & Waite

(57) ABSTRACT

An apparatus for weighing moving postal items, particularly letters arranged standing on edge, has a weighing pan for the postal items having a lightweight structure resistant to bending and being torsionally stiff, the weighing pan being coupled to a weighing cell at the approximate location of the shared center of gravity of the weighing pan 6 and a piece of mail arranged centrally on the weighing pan 6 and having the highest allowable weight and the largest allowable dimensions. The weighing pan has a back wall 61 for guiding the piece of mail and a transport unit for the piece of mail that simultaneously forms the bottom of the weighing pan.

17 Claims, 12 Drawing Sheets

APPARATUS FOR WEIGHING MOVING POSTAL MATTER

BACKGROUND OF THE INVENTION

1. Field of the Invention

The invention is directed to an apparatus for weighing moving postal items, particularly letters arranged standing on an edge.

2. Description of the Prior Art

Mail processing systems are usually composed of a mail separating device, a scale, a postage meter machine and a deposit means, as described in German OS 27 17 721 and German PS 37 31 525. The scale can be integrated in the postage meter machine, see DE-M 96 09 167.3 in the Utility Model Gazette of the German Patent Office dated May 24, 1997, Part 1a, goods class 18/02.

The weight range of the loads to be weighed usually amounts to 3 through 1000 g given a load thickness between 0.5 and 20 mm.

The postal items, referred to below as "letters", are deposited in a stack in the separating device and are separated and sealed as needed.

The letters are printed to identify a recipient and/or a postage amount according to the identified weight and the predetermined address in the franking and/or addressing machine.

In a known franking and/or addressing machine, as described in German PS196 05 014 and German PS 196 05 015, letters standing on an edge are continuously conducted past a print head. The printer head is stationarily positioned during the printing process. Weighing of the item is unaffected by this arrangement.

A scale is known from German Utility Model 296 01 418 that is particularly provided for weighing pieces of mail. The letters are weighed standing on an edge with this scale. This scale has a pan with a depression and an adjacent upright supporting surface. The letter has an edge seated in the depression and has a lateral surface lying against the supporting surface. The scale has a load cell which is resilient or deformable such that the load cell with a letter on the pan moves vertically downwardly to an extent that increases with the weight of the load on the load cell. The scale is further provided with transducer that generates an electrical signal corresponding to the vertical downward motion, this electrical signal corresponding to the load weight.

The pan is intentionally designed to have such a short horizontal extent that the letter must lie approximately centrally thereon in order not to fall off. This causes the center of gravity of the load to be located approximately at the horizontal center of the load cell and consequently the load exerts no significant tilting force on the load cell. The height of the load at this center likewise has no influence on the measured result.

For weighing items at high conveying speed, however, a pan is required whose horizontal length is at least equal to the maximum length that the item to be weighed exhibits in the conveying direction. This means that the known arrangement described above is only suitable for weighing loads at rest and the success of the weighing is dependent on the care of the operator in properly placing the item on the load cell pan.

In the franking system according to German PS 37 31 525, the letters are conveyed with horizontally disposed conveyor belts. The scale is arranged between the letter separating means and the franking machine and is linked via a transport control to the neighboring devices so that the letter transport is interrupted for the weighing process. The weighing time is dimensioned such that a stable weighing condition occurs during the interruption. An empirically determined value thereby forms the basis that a stable weighing condition is achieved when three successive count signals of the load cell are acquired within a predetermined time.

The load cell is secured on a base in order to reduce torsional stresses so that the horizontal middle line of the load cell is substantially aligned with the surfaces of the conveyor belts. Three conveyor belts arranged in parallel form a conveyor means that is seated in an elongated, small u-shaped profile member having a side wall flanged to the load cell. Detents are arranged under the profile member as overload protection.

Due to the implementation with three conveyor belts and the appertaining drive and deflection rollers, this arrangement exhibits a relatively high mass. Moreover, the profile member must have a wall thickness which is sufficient to assure a minimum stiffness, thus adding further to the mass. A high overall mass—a multiple of the maximum letter weight as experience has shown—has a correspondingly low natural frequency. As is known, the square of the natural frequency is inversely proportional to the mass and proportional to the stiffness of a body. If the weight measurement precision is to remain unchanged, the required weighing time, and accordingly the transport time across the scale, become longer as the natural frequency becomes lower. This type of coupling the profile member to the transport means causes a bending moment that correspondingly limits the selection of the load cell.

In the aforementioned German OS 27 17 721 letters are conducted across a horizontally disposed pair of an electronic scale with a transport means composed of a number of parallel belts, analogously to German PS 37 31 525. Weighing is carried out during transport, i.e. this is a type of scale referred to as a "dynamic scale". The transport speed and the length of the transport path are thereby dimensioned so that the necessary equipoise time of the scale is achieved, following which letter leaves the weighing region. Here, too, the transport means exhibits a low natural frequency. This requires a correspondingly long weighing pan and a low transport speed and/or a reduction of the upper weighing limit.

Both of the above-described scales are specifically designed for transporting the letters lying flat. Employment of these known transport devices for vertical letter transport would result in a further disadvantage of a higher measuring imprecision since the load center of the letters would then be significantly farther from the load cell, and the load arm larger.

SUMMARY OF THE INVENTION

An object of the present invention is to provide an apparatus for weighing moving postal items which can be used in a wider range of applications then conventional devices of this type, with a minimum of structural complexity.

A further object of the invention is to provide an apparatus for weighing letters that are arranged standing on edge and are continuously moved and which achieves a high measuring precision over a broad weight range given a high transport speed.

The above objects are achieved in accordance with the principles of the present invention in an apparatus for weighing moving postal items, particularly letters standing on edge, wherein a weighing pan for the postal items is provided which has a light weight, bending-resistant and torsionally stiff structure, the weighing pan being coupled to a load cell at an approximate location of the shared center of gravity of the weighing pan and a piece of mail arranged centrally on the weighing pan which has a highest allowable weight and a largest allowable dimension. The weighing pan has a back wall for guiding the piece of mail and a transport unit for the piece of mail, a portion of the transport unit forming a bottom of the weighing pan.

The coupling of the weighing pan to the movable part of the load cell in the region of the shared center of gravity of weighing pan and the largest and maximally-dimensioned allowable load arranged approximately centrally thereon minimizes the negative influences of the load arm.

The implementation of the weighing basin in a light weight construction that is deflection resistant and resistant to torsion lowers the mass thereof while still achieving a high stiffness, so that a higher natural frequency and consequently shorter response times for the overall measuring systems are achieved. Resonant frequencies can be more easily filtered out in higher frequency ranges. This in turn allows a correspondingly high letter conveying speed.

In an embodiment wherein the back wall of the weighing pan has a skeleton-like structure, the maximum stroke of the weighing pan lies in the micrometer range and accordingly the parts of the postal items coming into contact with the back wall can project through correspondingly narrow, slot-shaped recesses in the rear guide wall of the scale. This enables a further reduction of the mass of the weighing pan while still maintaining a high stiffness. Since the back wall of the weighing pan is predominantly covered by the rear guide wall of the scale, possible disturbing external influences due, for example, to air drafts on the back wall are prevented.

In an embodiment wherein the admission region of the scale is designed such that the letter is brought tangentially to the lower and back supporting surfaces as well as to the front supporting surface of the weighing pan, disturbing pulses on the load cell that could falsify the measured result are largely avoided. Open letters cannot have their envelope flap hung up at the admission region in this embodiment.

Correspondingly, the discharge region of the scale is fashioned such that the letter does not contact the region following the weighing pan until the end of the weighing process. The projecting arrangement of the transport surface and of the back supporting surface in the weighing pan region relative to the following transport and supporting surface enables the weighing pan to be shortened without a corresponding limitation of the measuring time. A shorter weighing pan, moreover, supports the efforts to eliminate mass and thus to increase the natural frequency.

DESCRIPTION OF THE PREFERRED EMBODIMENTS

For simplification and to facilitate understanding, the illustrations are implemented partially schematically.

Figure 1:
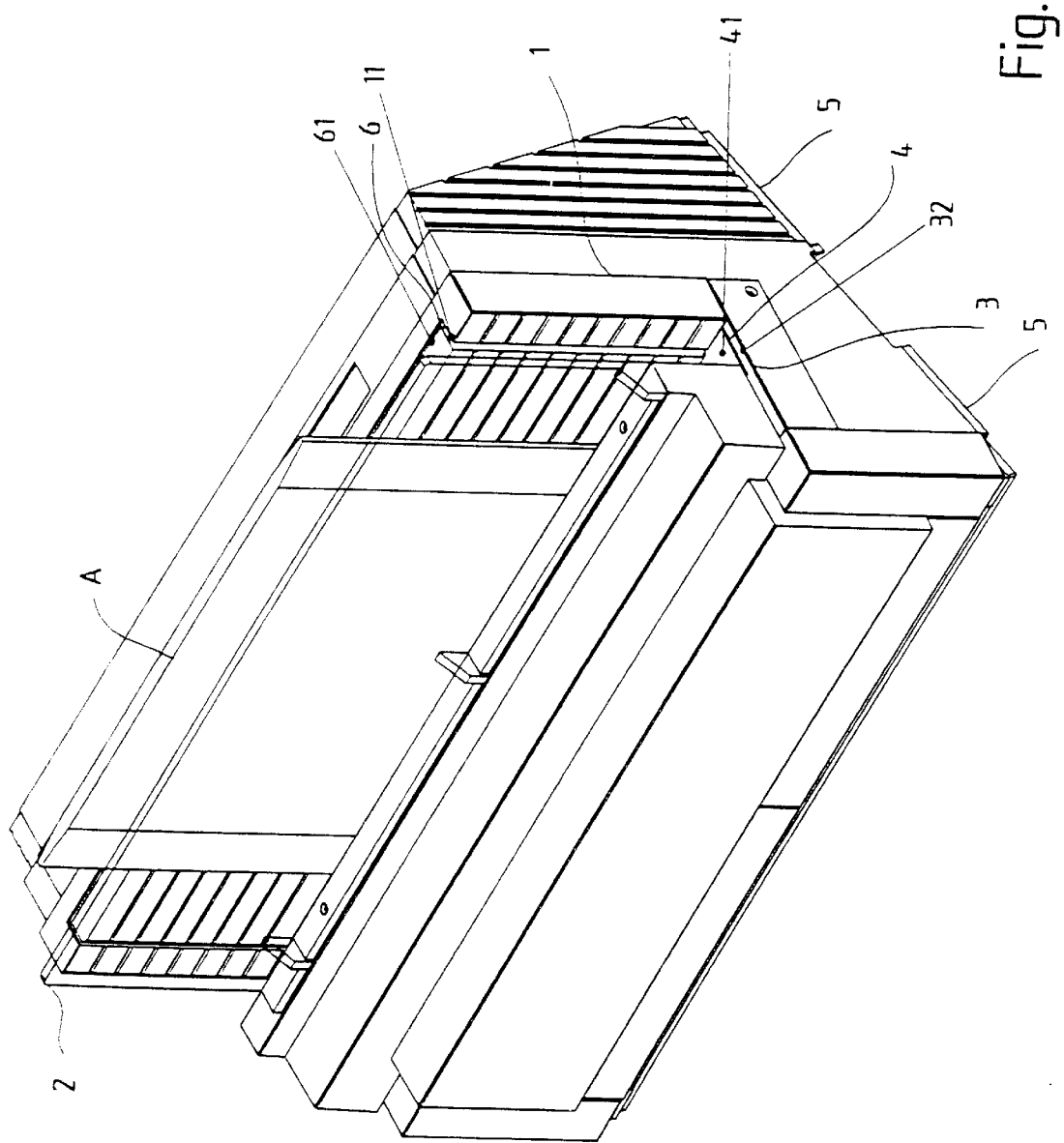
FIG. 1 is a perspective view of a scale constructed and operating in accordance with the invention from the upper right front.

As shown in FIG. 1, a letter A is arranged on a conveyor belt 41 of a transport unit 4. The letter A is standing on edge and lying against the back wall 61 of a weighing pan 6. The back wall 61 is received in an adapted recess 11 of the rear guide wall 1 of the scale such that the back wall 61 is freely moveable parallel to the rear wall 1 and the back wall 61 projects beyond slightly the front side of the rear wall 1. In the admission region, the front edge of the back wall 61 is beveled to a point below the level of the front side of the guide wall 1. The transport unit 4 forms the base or bottom of the u-shaped weighing pan 6 whose front wall 62 is lower compared to the supporting, parallel back wall 61 (also see FIGS. 3 and 5). The front wall 62 is bent slightly forward in the admission region and is of such a height that the envelope flap of an open letter A strikes the front wall without impact and can only rest thereagainst. As a result, the letter A is also securely guided by its lower edge and cannot slide off of the conveyor belt 41. A front cover plate 2, preferably made of plexiglass, is provided in the scale preceding the front wall 62 of the weighing pan 6 parallel to and at a slight distance therefrom, this cover plate 2 being put in place in common with the back guide wall 1 on a lower guide wall 3. The cover plate 2 prevents access to the letter A during the transport and weighing procedure and reduces the influence of air movements on the letter A that can falsify the weight measurement. The conveyor belt 41 is dimensioned of such a width that a letter A having the greatest allowable thickness, for example 20 mm, has enough space so as not to touch the front cover plate 2 of the scale when seated against the back wall 61 of the weighing pan 6. Falsifications of the weight measurement due to friction are thus avoided. The back guide wall 1 is inclined slightly backward, preferably by 18° beyond the perpendicular. This corresponds to an optimization angle already calculated for an automatic letter feed and a franking machine (also see German PS 196 05 014 and German PS 196 05 015). The lower guide wall 3 is arranged orthogonally relative to the back and relative to the front cover plate 2. A defined letter attitude and a matched adaptation to preceding and following devices is thus achieved. All of these assemblies or parts are secured to a chassis 5 via corresponding adapters.

Figure 2:
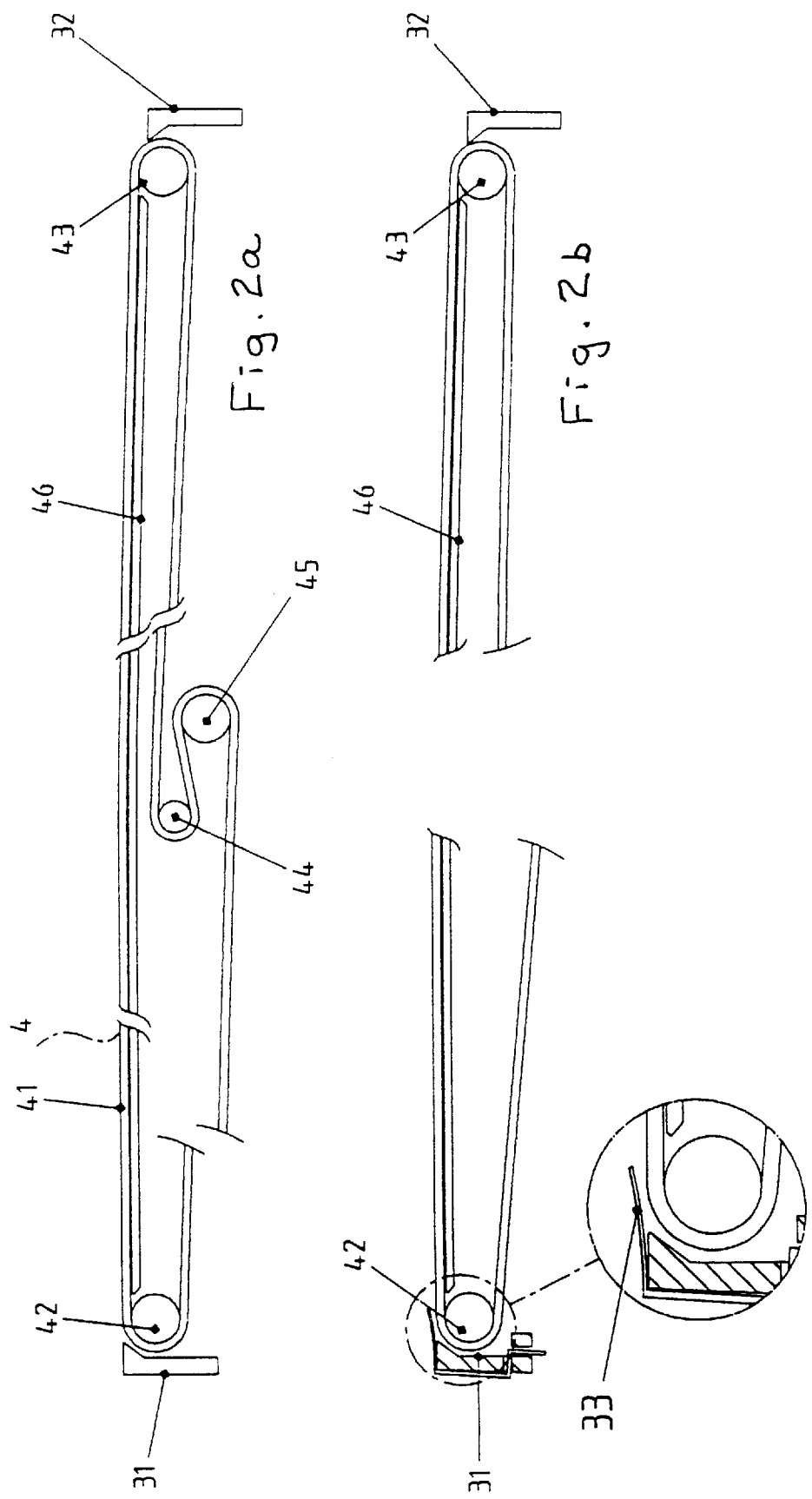
FIGS. 2a and 2b schematically illustrate the design of the letter transport of FIG. 1 in the scale shown in FIG. 2a without further auxiliaries in the admission region, and shown in FIG. 2b with a feather key in the admission region.

As shown in FIGS. 2a and 2b, the front end 31 of the lower guide wall 3 is fashioned such in the admission region of the scale so that the letter A places itself approximately tangentially onto the conveyor belt 41. The back end 32 of the lower guide wall 3 is fashioned in the discharge region of the scale so that the letter A initially is unsupported when departing the conveyor belt 41. To this end, the upper side of the back end 32 of the lower guide wall 3 is arranged lower then the level of the upper side of the conveyor belt 41.

In a first embodiment according to FIG. 2a, the upper side of the front end 31 of the lower guide wall 3 is arranged at the same level as the upper side of the conveyor belt 41.

In a second embodiment according to FIG. 2b, a thin, soft leaf spring 33 is secured to the front end 31 so that, under the load of the letter, this spring 33 lies at the same level on the upper side of the front end 31 and of the first part of the conveyor belt 41.

As FIG. 2a also shows, the transport unit 4, in addition to the conveyor belt 41, has front and back deflection rollers 42 and 43 and a drive roller 44, in additional to a tension roller 45 for the conveyor belt 41. The axle of the tension roller 45 is adjustable in the letter transport direction so as to maintain the conveyor belt 41 stretched adequately tightly.

In order to operate with only two deflection rollers 42 and 43 and to set the conveyor belt tension in a gentle fashion while still assuring a continuous and smooth letter movement, a supporting plate 46 is provided under the upper belt region that carries the letter load. Given a higher load, the conveyor belt 41 slides along on the supporting plate 46, whose surface is smooth.

The drive roller 44 is connected to a motor 49 (see FIG. 4) via suitable transmission arrangement which can be either a gear wheel drive arrangement or a belt drive arrangement.

Figure 3:
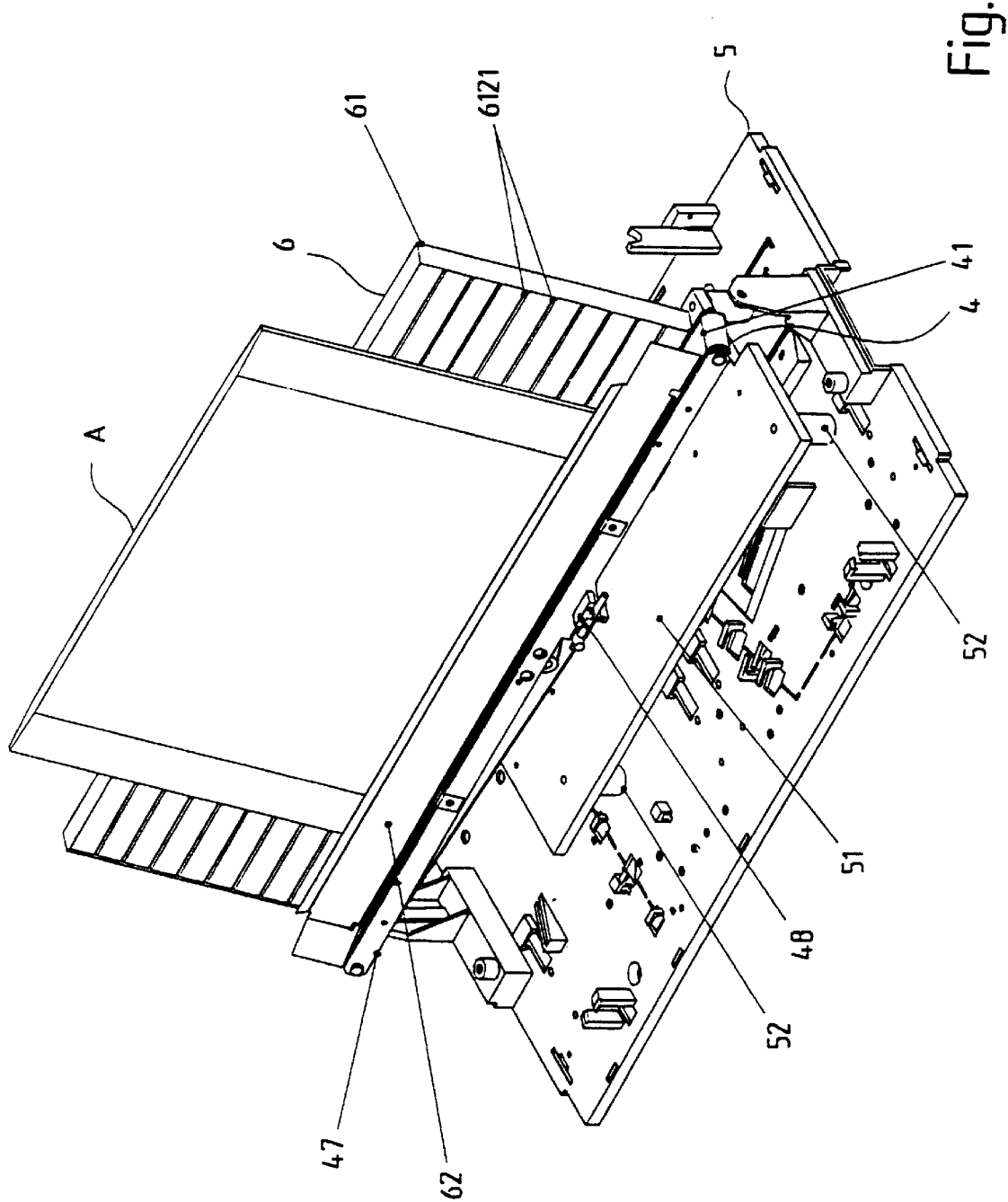
FIG. 3 is a perspective view of the inventive device according to FIG. 1 from the front upper right.
Figure 4:
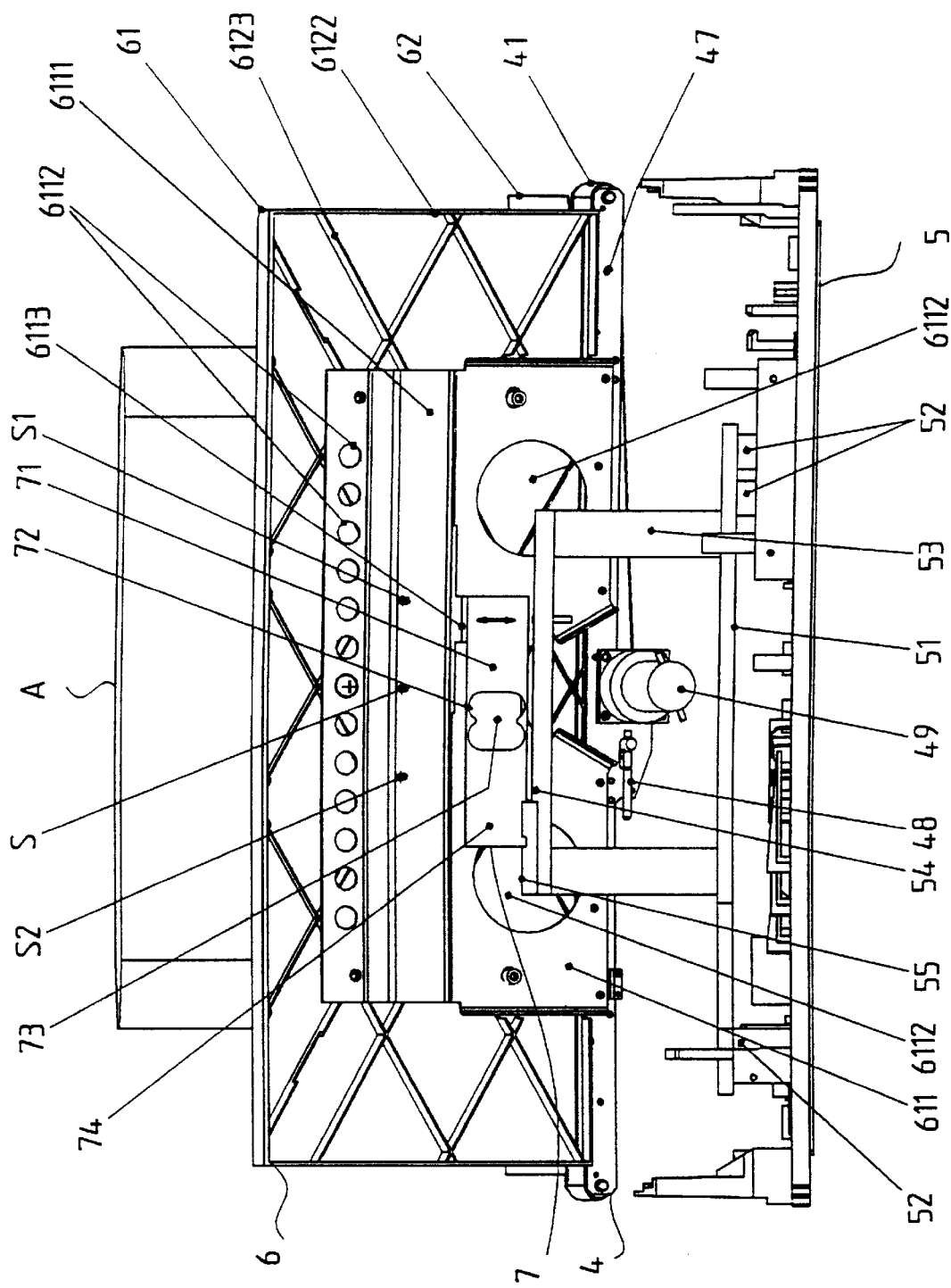
FIG. 4 is a back view of the inventive device according to FIG. 3.

As shown in FIGS. 3 and 4, all rollers 42, 43, 44, 45 of the transport unit 4 are seated between two elongated supporting plates 47. The supporting plates 47 define the length of the transport unit 4.

A tensioning device 48 for adjusting the tension roller 45 is also secured to the supporting plates 47.

The front wall 62 of the weighing pan 6 is also secured to the front supporting plate 47. It would also be possible to implement the two together as one part.

Analogously, the supporting plate 46 for the conveyor belt is secured to the back supporting plate 47. Again, it would be possible to implement the two parts together as one part.

The transport unit 4 is secured to the back supporting plate 47 at the back wall 61 of the weighing pan 6 so that the motor 49 and the drive roller 44 are disposed closely below the shared center of gravity S.

The shared center of gravity S is the center of gravity resulting from the center of gravity SW of the weighing pan 6 and the center of gravity SB of the heaviest and largest allowable letter A, when this letter A is arranged in the middle of the weighing pan 6.

A base plate 51 is connected to the chassis 5 via spacers 52 and is arranged parallel to the chassis 5. The spacers 52 can be implemented as resilient blocks for the purpose of damping vibrations. The back wall 61 of the weighing pan 6 is composed of a guide plate 612 for the letter A and a supporting plate 611 connected thereto at the back side.

The back wall 61 could also be a one piece element with the corresponding force introduction element formed therewith in a sandwich structure. The one-piece element can be composed of a closed pore, hard-shelled foamed polystyrol and the force introduction element can be composed of extra hard duraluminum.

The guide plate 612 is box-shaped. The front side is fashioned essentially smooth and is provided with horizontally proceeding glide ribs 6121 for the letter A. The back side has a circumferential collar 6122 and webs 6123 proceeding diagonally relative to one another, resulting in a high shape stability.

The guide plate 612 is preferably composed of a structural plastic such as acrylonitrile-butadiene-styrol (ABS) or carbon fiber-reinforced plastic.

The carrying plate 611 and the T-member 6113 can be composed, for example, of extra hard duraluminum.

The supporting plate 611 is provided with recesses 6112 in the regions which are subject to less mechanical load, in order to thus save material and weight.

Along its horizontal extent, the supporting plate 611 has a continuously outwardly coined shoulder 6111.

The supporting plate 611, and thus the entire weighing pan 6, is secured to this shoulder 6111 to the free end 71 of a weighing cell 7 via a flat, intervening T-member 6113, such that the shared center of gravity S lies slightly above the sensitive region 72 of the weighing cell 7.

Another relevant shared center of gravity is the shared center of gravity S1, which is the center of gravity resulting from the center of gravity SW of the weighing pan 6 and the center of gravity SB of the letter A when the letter A has proceeded onto the weighing pan 6 to such an extent at the input side that the measuring process can begin.

The shared center of gravity S2 is the center of gravity resulting from the center of gravity SW of the weighing pan 6 and the center of gravity SB of the letter A when the letter A has moved to such an extent on the weighing pan 6 at the output side that the measuring process must be ended (also see FIG. 11).

The sensitive region 72 of the weighing cell 7 is the region that is most highly influenced by the load.

In its middle region, the weighing cell 7 has a through-hole 73. The remaining wall sections function as a parallelogram guide for the free end 71 of the weighing cell 7, so that this executes an approximately vertical movement corresponding to the indicated arrow directions under alternating load influence. The stroke of the free end 71 thereby lies in the micrometer range.

Transducers, for example, strain gauges, are secured on the upwardly disposed wall section that corresponds to the sensitive region 72. Under load, the wall section is deformed, and consequently each strain gauge is deformed and the value of resistance thereof is modified. The change in resistance is interpreted as weight criterion in a connected, electrical circuit.

Figure 5:
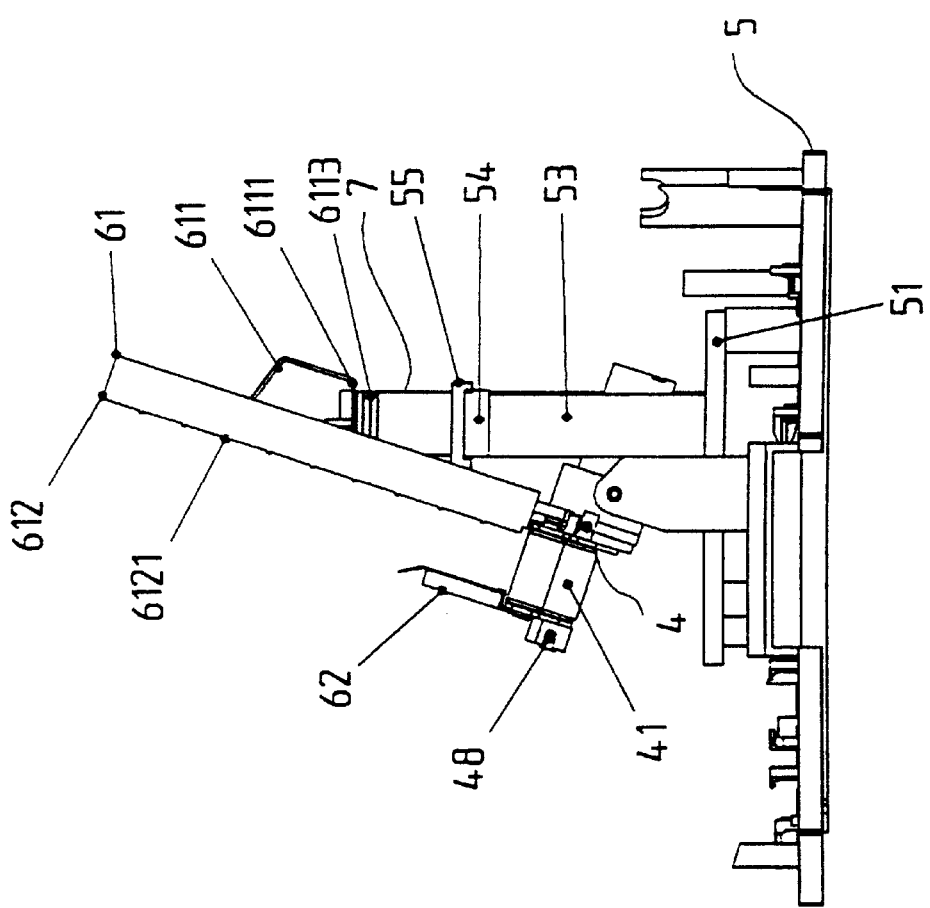
FIG. 5 is a side view of the inventive device according to FIG. 3 from the right.

The fixed end 74 of the weighing cell 7 is secured via an adapter 55 on a traverse 54 that is seated on two columns 53, that are in turn secured on the base plate 51 (also see FIG. 5).

Figure 6:
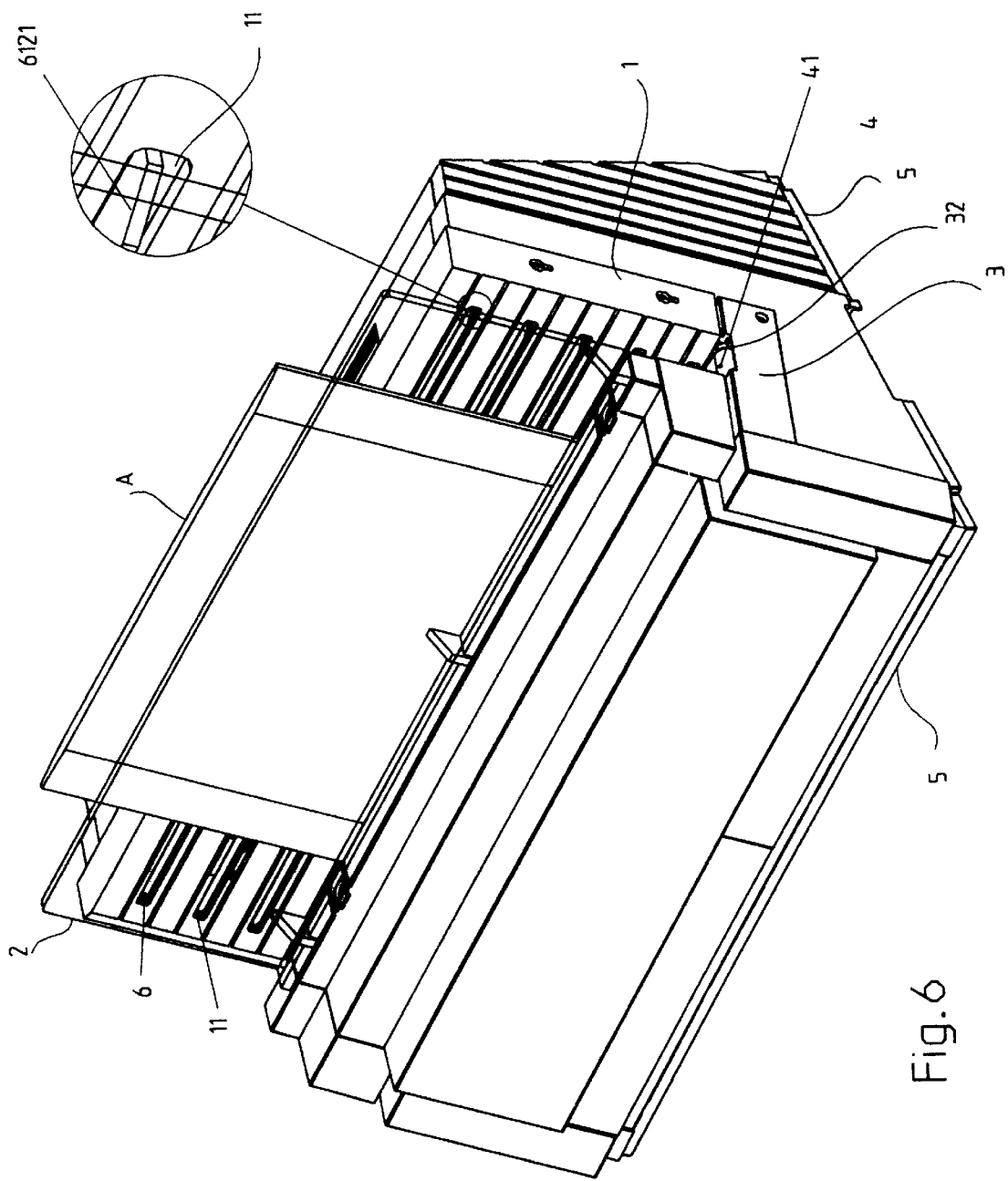
FIG. 6 is a perspective view of a scale wherein the back wall of the weighing pan is predominantly arranged behind the guide wall of the scale, shown from the front upper right.

FIG. 6 shows a scale embodiment wherein the back wall 61 of the weighing pan 6 is arranged mainly behind the rear guide wall 1 of the scale. The back wall 61 has horizontally proceeding, projecting glide ribs 6121 which project through adapted recesses 11 of the rear guide wall 1 (also see FIGS. 7, 9, and 10). The recesses 11 are dimensioned slightly larger in their height expanse than the largest stroke of the weighing pan 6.

The back wall 61 of the weighing pan 6 is arranged such behind the rear guide wall 1 of the scale, and has its glide ribs 6121 received in the recesses 11 of the guide wall 1, so that the back wall 61 is free-floating as a whole, parallel to the guide wall 1 and having the front part of the glide ribs 6121 projecting to such an extent relative to the front side of the guide wall 1 that the letter A touches only the glide ribs 6121 with its broad side, and not touch the guide wall 1.

Figure 7:
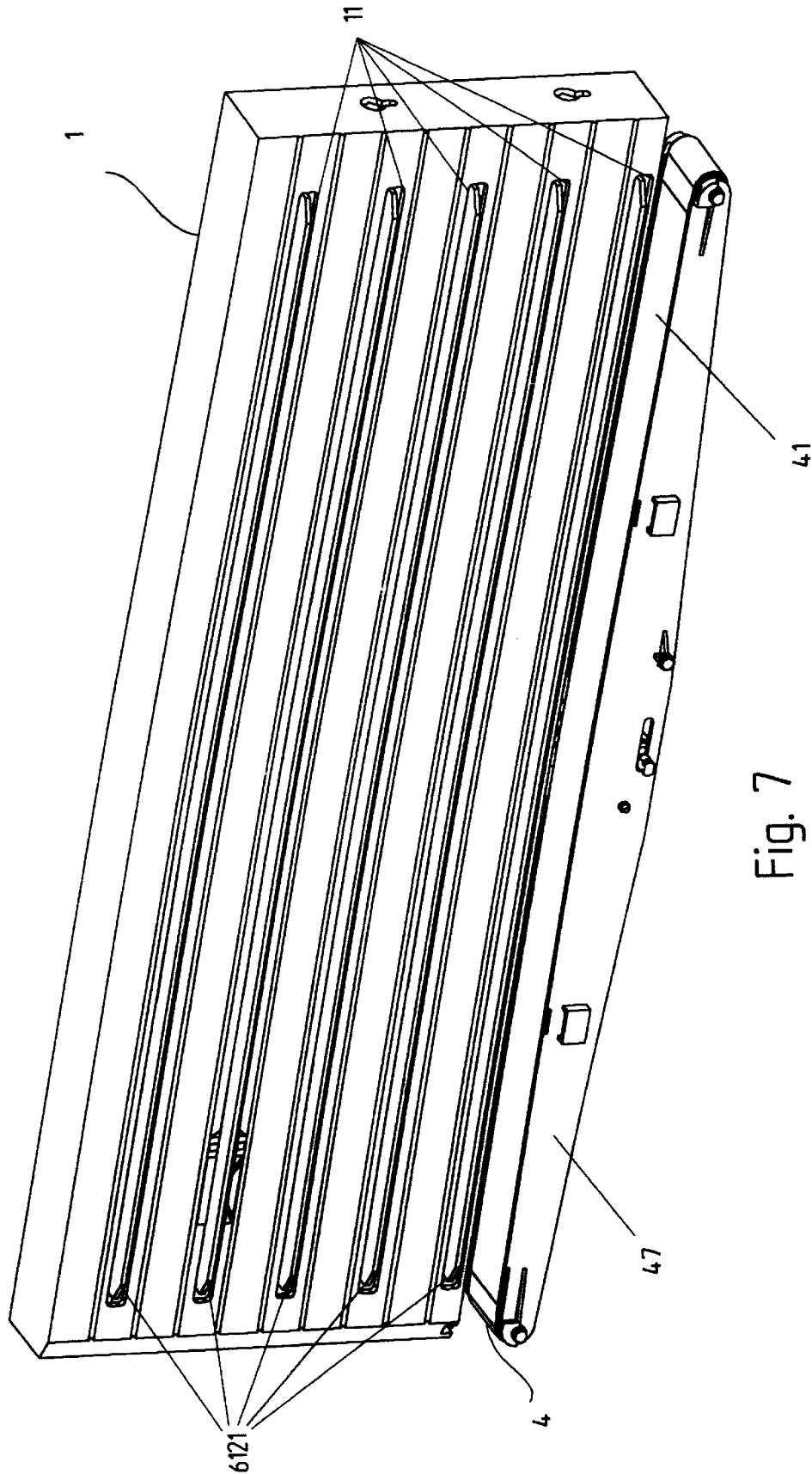
FIG. 7 is a perspective view of the back guide wall of the scale with the weighing pan according to FIG. 6, from the front upper right.

It can be seen in FIG. 7 how the transport unit 4 with the conveyor belt 41 guided between two supporting plates 47 is arranged relative to the guide wall 1.

The slot-shaped recesses 11 in the guide wall 1 for the glide ribs 6121 proceed horizontally and are arranged equidistantly relative to one another.

Figure 8:
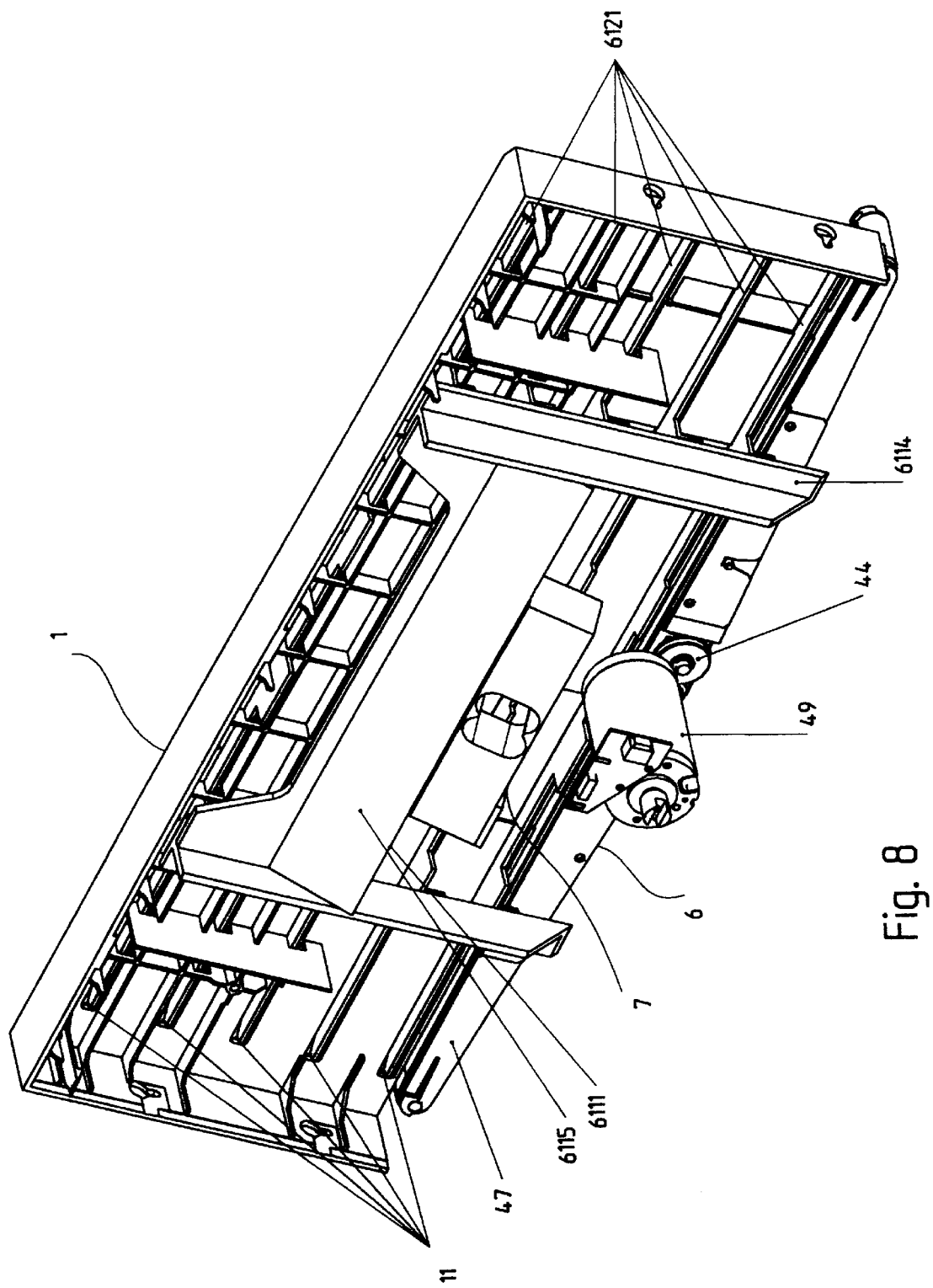
FIG. 8 is a perspective view of the back guide wall of the scale with the weighing pan according to FIG. 6, from the back upper right.

As can be seen in FIG. 8, the rear guide wall 1 of the scale is box-shaped in this embodiment with a circumferential edge 12.

Figure 9:
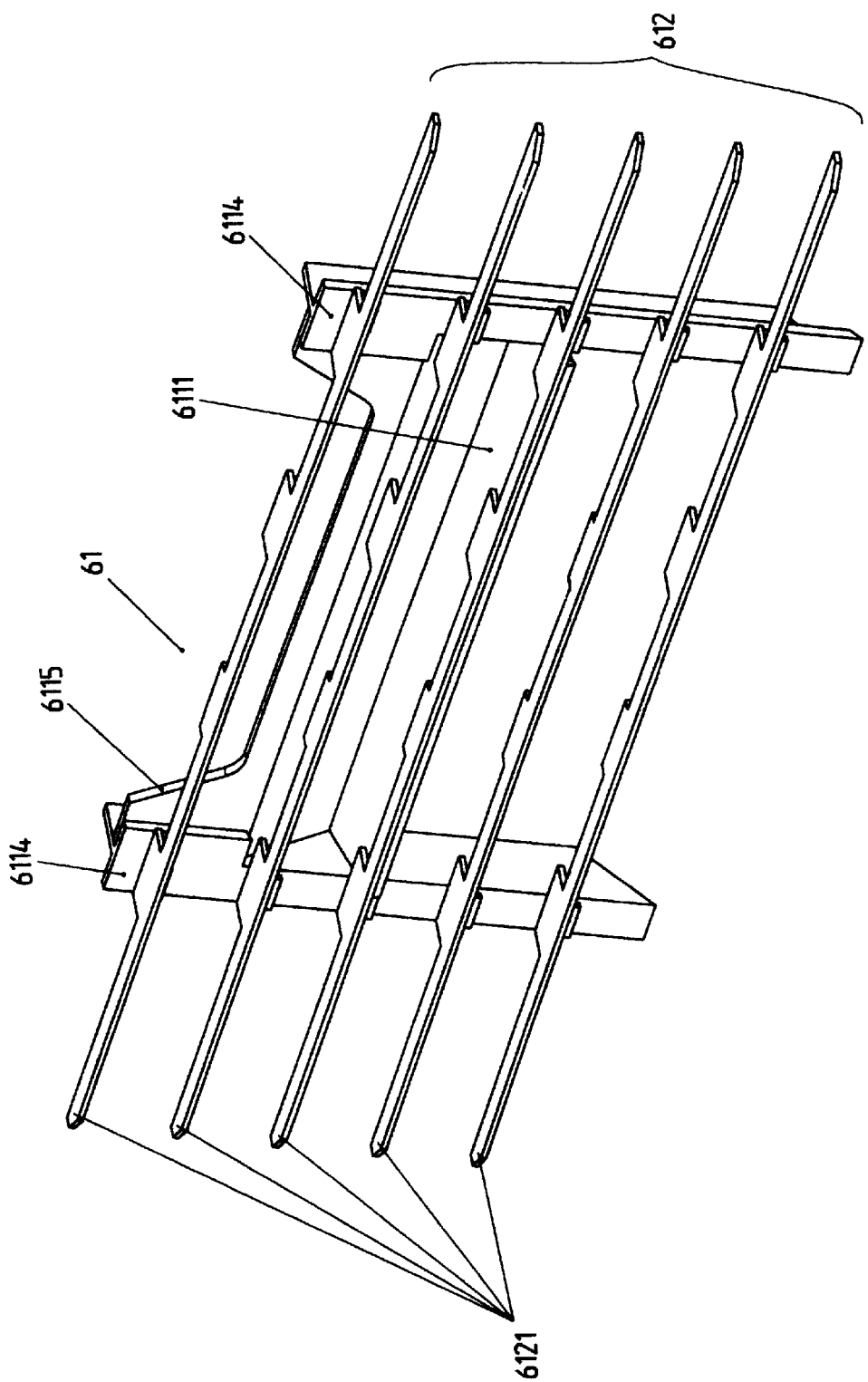
FIG. 9 is a perspective view of the back wall of the weighing pan according to FIG. 6, from the front upper right.

As shown in FIG. 9, the back wall 61 of the weighing pan 6 is functionally composed of a guide unit 612 for the letter A and a carrying unit 611 connected thereto at the back side. The guide unit 612 is formed by the glide ribs 6121. The carrying unit 611 is composed of two T-carriers 6114 and an angled plate 6115 arranged between and connected to these carriers 6114 and having a shoulder 6111 for coupling to the weighing cell 7 (also see FIGS. 8 and 10).

The glide ribs 6121 are secured to the transverse webs of the T-carriers 6114, with the T-carriers 6114 being arranged orthogonally relative to the glide ribs 6121. For further enhancing the stiffness of the guide unit 612, the ends of the glide ribs 6121 also can be connected to one another by suitable cross-members.

Figure 10:
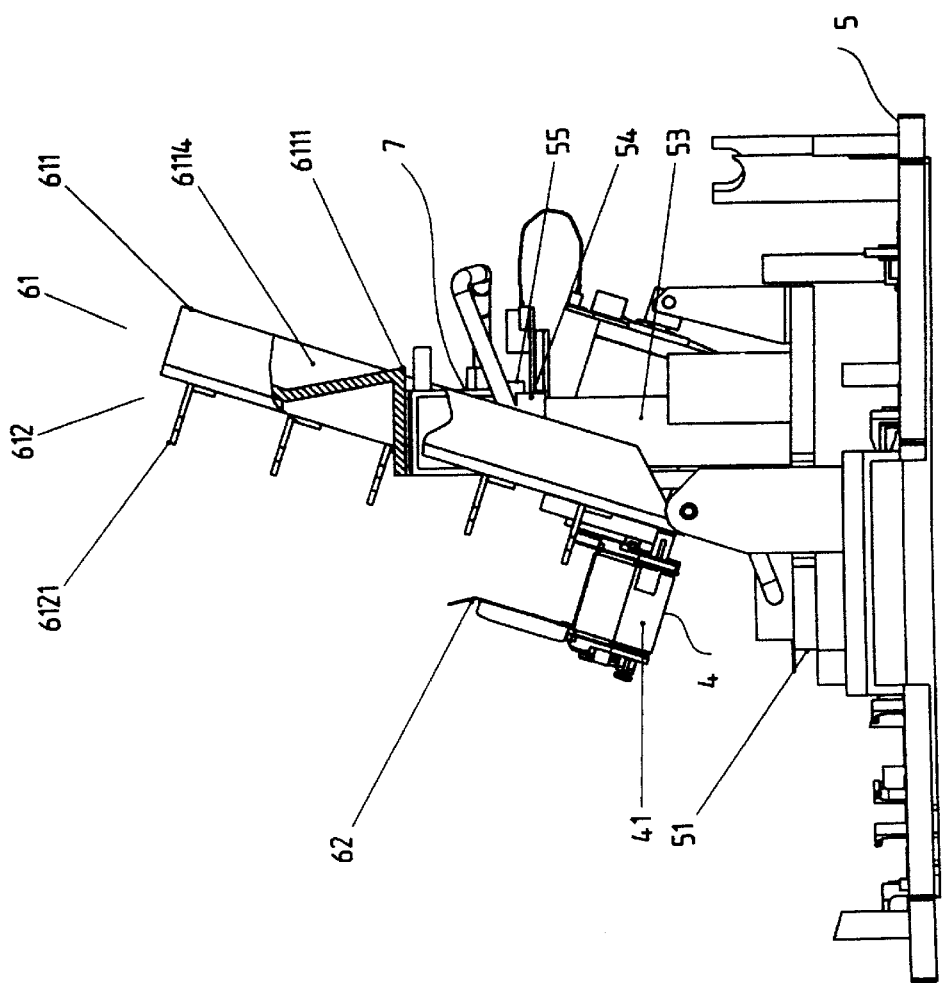
FIG. 10 is a partial side view of the scale according to FIG. 6 from the right.

As shown in FIG. 10, the weighing cell 7, analogous to the first exemplary embodiment, is secured on a traverse 54 via an adapter 55, the traverse 54 in turn being secured on the base plate 51. The base plate 51 is directly connected to the chassis 5 of the scale.

FIGS. 11a–11d show the relationships between the center of gravity SB of the letter A and the center of gravity SW of the weighing pan 6.

Figure 11A:
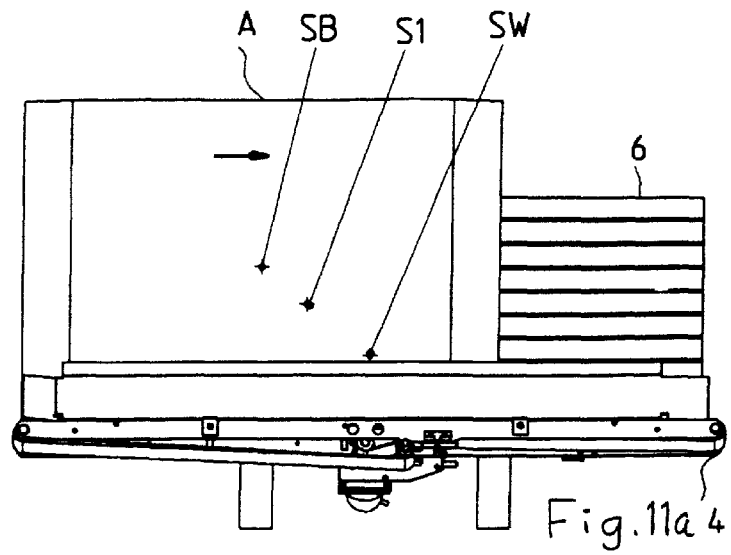
FIGS. 11a through 11b show characteristic measuring attitudes of a letter on the weighing pan in the scale of FIG. 1, with FIG. 11a showing a front view with a letter in the admission region, FIG. 11b showing front view with a letter in the middle part, and FIG. 11c showing a side view thereof, and FIG. 11d showing a front view with a letter in the discharge region.

According to FIG. 11a, the letter A is located in the admission region, so that the resulting center of gravity S1 is likewise located to the left of the center of the weighing pan 6. The relevant load arm in this situation is the orthogonal distance between the resultant center of gravity S1 and the center of gravity SW of the weighing pan 6.

Figure 11C:
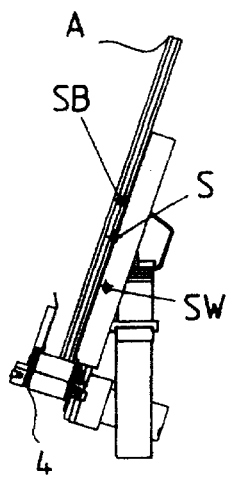
Figure 11B:
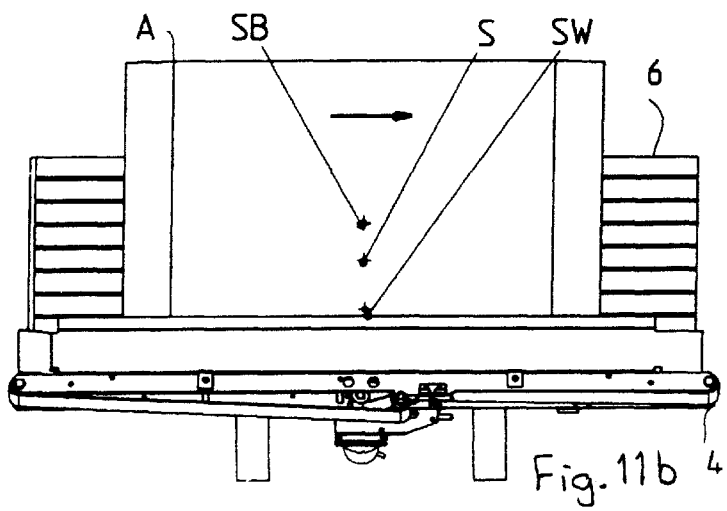

According to FIGS. 11b and 11c, the letter A is located exactly in the middle of the weighing pan 6, so that all three centers of gravity SB, SW, S lie on the center line of the weighing pan 6 and the load arm is equal to zero.

Figure 11D:
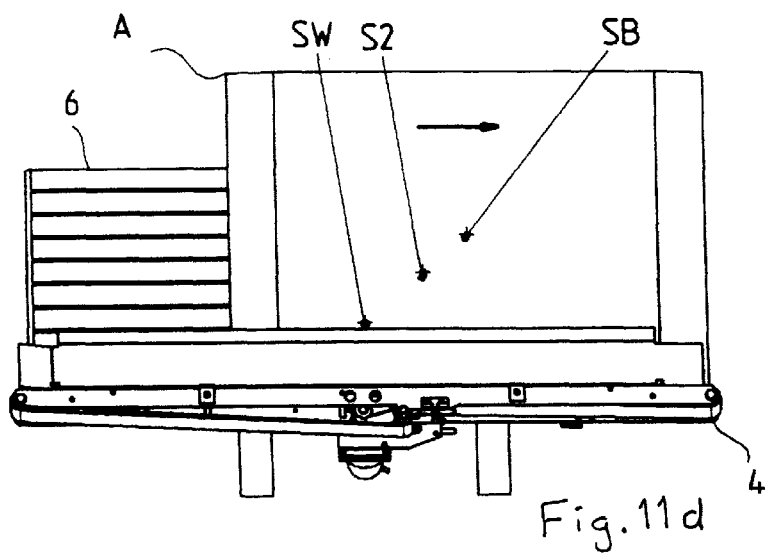

According to FIG. 11d, the letter A is located in the discharge region, so that the resulting center of gravity ST is likewise located to the right of the middle of the weighing pan 6. The relevant load arm is the orthogonal distance between the resulting the center of gravity S2 and center of gravity SW of the weighing pan 6.

Figure 12:
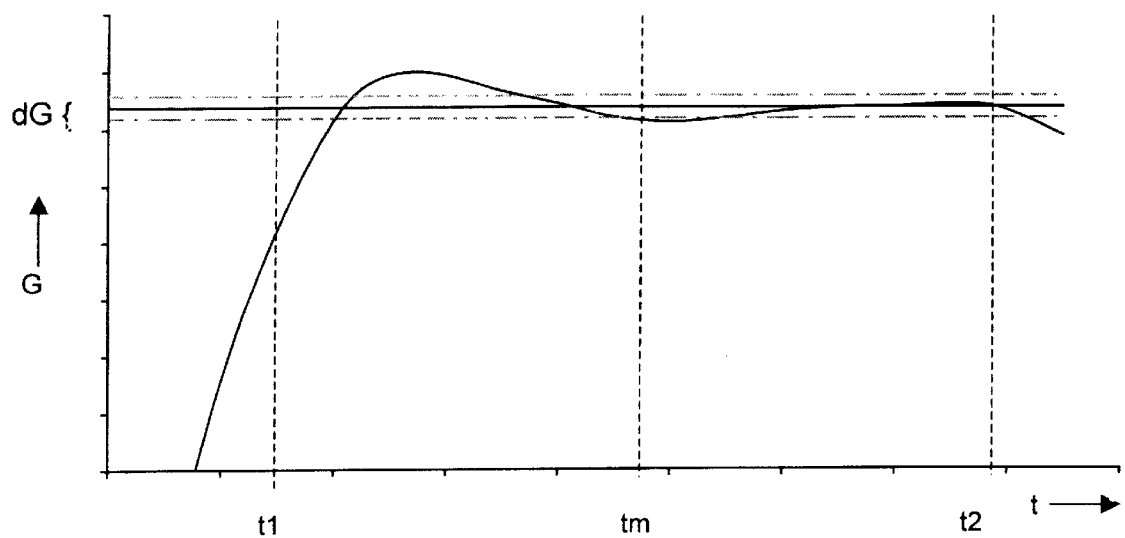
FIG. 12 is a time diagram showing the response of the scale during the maximally allowed measuring range.

As shown in FIG. 12, the measuring process begins at a time t1 at which the center of gravity S1 is effective and ends no later then a time t2 at which the center of gravity S2 is effective. At a time tm, the center of gravity S is effective. The weight G is measured with an allowable deviation of dG.

Although other modifications and changes may be suggested by those skilled in the art, it is the intention of the inventors to embody within the patent warranted hereon all changes and modifications as reasonably and properly come within the scope of their contribution to the art.

We claim as our invention:

1. An apparatus for weighing moving postal items, comprising:
    a weighing pan having a light weight, bending-resistant and torsionally stiff structure with a center of gravity, said weighing pan being adapted to receive a postal item standing on edge having a maximum allowable weight and a maximum allowable dimension and a center of gravity;
    a load cell coupled to said weighing pan which emits an output signal indicative of a weight of a postal item on said weighing pan, said load cell being disposed at a location substantially coinciding with a shared center of gravity of the center of gravity of said weighing pan and the center of gravity of said postal item when said postal item is centrally disposed on said weighing pan;
    a transport unit for successively moving postal items through said weighing pan; and
    said weighing pan having a back wall disposed to guide postal items through said weighing pan and having a bottom formed by a portion of said transport unit.

2. An apparatus as claimed in claim 1 wherein said weighing pan has an admission region for postal items and a discharge region for postal items, said admission region being disposed so that a postal item being admitted to said weighing pan tangentially strikes said portion of said transport unit and moves against said back wall, and said discharge region being recessed laterally relative to said back wall and downwardly relative to said bottom so that postal items leaving said weighing pan are at least partially unsupported in said discharge region.

3. An apparatus as claimed in claim 1 wherein said transport unit comprises a conveyor belt forming said bottom of said weighing pan.

4. An apparatus as claimed in claim 1 wherein said back wall comprises a guide plate and a carrying plate connected to said guide plate at a rear of said guide plate, said guide plate being box-shaped and having a smooth front side against which postal items slide, said guide plate having horizontal glide ribs for supporting postal items and a circumferential collar at said rear with a plurality of diagonally proceeding webs, and said carrying plate having regions subjected to low mechanical stress with recesses therein and an outwardly coined shoulder proceeding continuously horizontally, said load cell having a load-sensitive region which is most heavily influenced by a load on said load cell and said apparatus further comprising a T-shaped element coupling said outwardly coined shoulder to a free end of said load cell so that said shared center of gravity is disposed closely above said load-sensitive region of said load cell.

5. An apparatus as claimed in claim 4 wherein said guide plate is comprised of a material having a low specific weight and high mechanical strength.

6. An apparatus as claimed in claim 5 wherein said guide plate is comprised of a plastic selected from the group consisting of acrynotrile-butadiene styrol and carbon fiber-reinforced plastic.

7. An apparatus as claimed in claim 4 wherein said carrying plate and said T-shaped member are comprised of extra hard duraluminum.

8. An apparatus as claimed in claim 1 wherein said back wall is skeleton-like having a plurality of horizontally proceeding, narrow slot-shaped recesses, and wherein said apparatus further comprises a rear guide wall disposed next to said back wall and having a plurality of glide ribs for postal items which project through said recesses in said back wall.

9. An apparatus as claimed in claim 8 wherein said weighing pan comprises a guide unit for guiding postal items therethrough, said guide unit including said back wall, and wherein said apparatus comprises a carrying unit for said guide unit, said carrying unit including said rear guide wall, and said glide ribs being parallel to and equidistant from one another.

10. An apparatus as claimed in claim 9 wherein said weighing pan proceeds through a maximum stroke when said postal item of said maximum permissible weight is disposed thereon, and wherein said load cell has a load-sensitive region which is most heavily influenced by a load on said load cell, and wherein said recesses in said back wall have a heigh which is larger than a thickness of one of said glide ribs plus said maximum stroke, and wherein said carrying unit comprises two T-shaped carriers and a plate disposed between and connected to said two T-shaped carriers, and a shoulder coupled to the weighing cell so that said shared center of gravity is disposed closely above said load-sensitive region.

11. An apparatus as claimed in claim 10 wherein each of said two T-shaped carriers has a cross-web, and wherein said glide ribs are disposed at said cross-webs of said T-shaped carriers and are disposed orthogonally relative to said cross-webs.

12. An apparatus as claimed in claim 1 wherein said weighing cell has a load-sensitive region which is most heavily influenced by a load on said load cell, and wherein said back wall comprises a single structural piece with at least one force introduction element in a sandwich structure therewith, said back wall being coupled to a free end of said weighing cell so that said shared center of gravity is disposed closely above said load-sensitive region.

13. An apparatus as claimed in claim 12 wherein said back wall is comprised of a closed-pore, hard-shelled foamed polystyrol material, and wherein said force introduction element is comprised of extra hard duraluminum.

14. An apparatus as claimed in claim 1 wherein said weighing pan has a Ushaped cross-section and has a front wall which is parallel to, and disposed lower then, said back wall, said front wall having a height allowing an envelope flap of an opened envelope comprising said postal item to lie only against said front wall, and wherein said front wall is angled away from said back wall in an admission region of said weighing pan, and wherein said back wall is inclined away from said front wall with said portion of said transport unit forming said bottom of said weighing pan being disposed perpendicularly relative to said wall.

15. An apparatus as claimed in claim 14 wherein said back wall is inclined by 18° relative to the vertical.

16. An apparatus as claimed in claim 14 wherein said transport unit comprises a conveyor belt forming said bottom of said weighing pan, a support plate disposed beneath said conveyor belt, said support plate being substantially coextensive with said portion of said conveyor belt forming said bottom of said weighing pan, a front deflection roller, a back deflection roller, a tensioning roller and a drive roller around which said conveyor belt is entrained, a motor mechanically coupled to said drive roller for moving said conveyor belt, a tensioning apparatus for adjusting a position of said tensioning roller to adjust a tightness of said conveyor belt, and elongated front supporting plate and an elongated rear supporting plate substantially parallel to and spaced from said front supporting plate with said front deflection roller, said back deflection roller, said tensioning roller and said drive roller being rotatably mounted between said front supporting plate and said back supporting plate, said front wall of said weighing pan being attached to said front supporting plate and said carrying plate being attached to said back supporting plate, with said back supporting plate so that motor and said drive roller are disposed closely below said shared center of gravity.

17. An apparatus as claimed in claim 16 further comprising a front cover plate disposed substantially parallel to and spaced from said front wall of said weighing pan, said front cover plate extending over an entire length of said apparatus and having a height at least as high as said back wall of said weighing pan.

* * * * *